US007624192B2

(12) United States Patent
Meyers et al.

(10) Patent No.: US 7,624,192 B2
(45) Date of Patent: Nov. 24, 2009

(54) FRAMEWORK FOR USER INTERACTION WITH MULTIPLE NETWORK DEVICES

(75) Inventors: Brian R. Meyers, Bellevue, WA (US); Gregory R. Smith, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1038 days.

(21) Appl. No.: 10/750,028

(22) Filed: Dec. 30, 2003

(65) Prior Publication Data

US 2005/0193143 A1   Sep. 1, 2005

(51) Int. Cl.
*G06F 15/173* (2006.01)
(52) U.S. Cl. .................. 709/238; 709/201; 709/203; 709/227; 709/230; 715/733; 715/740; 380/270
(58) Field of Classification Search .............. 709/203, 709/230, 238, 201, 227, 208; 715/733, 740; 380/270
See application file for complete search history.

(56) References Cited

U.S. PATENT DOCUMENTS

| | | | |
|---|---|---|---|
| 5,338,959 A | 8/1994 | Kim et al. | |
| 5,563,077 A | 10/1996 | Ha | |
| 5,786,818 A * | 7/1998 | Brewer et al. ............... 715/822 |
| 5,905,508 A | 5/1999 | Beitel | |
| 6,175,860 B1 | 1/2001 | Gaucher | |
| 6,199,049 B1 | 3/2001 | Conde et al. | |
| 6,249,755 B1 | 6/2001 | Yemini et al. | |
| 6,405,261 B1 | 6/2002 | Gaucher | |
| 6,405,315 B1 | 6/2002 | Burns et al. | |
| 6,421,664 B1 | 7/2002 | Groeschel et al. | |
| 6,437,803 B1 * | 8/2002 | Panasyuk et al. ............. 715/733 |
| 6,475,890 B1 | 11/2002 | Yu | |
| 6,480,896 B1 | 11/2002 | Brown et al. | |
| 6,542,925 B2 | 4/2003 | Brown et al. | |
| 6,562,665 B1 | 5/2003 | Yu | |
| 6,570,590 B1 | 5/2003 | Dubrow et al. | |

(Continued)

FOREIGN PATENT DOCUMENTS

WO    WO 2004/059726 A1    7/2004

OTHER PUBLICATIONS

International Search Report PCT/US2005/033439, mailed Jan. 31, 2006 (7 pgs.).

(Continued)

*Primary Examiner*—Tonia L Dollinger
*Assistant Examiner*—Kyung H Shin
(74) *Attorney, Agent, or Firm*—Lee & Hayes, PLLC

(57) ABSTRACT

A framework for providing user interaction with one or more networked devices. The invention allows for user configuration of networked computers such that each of the networked computer input and output devices interact with one another in a prescribed manner. The configuration associates relative geographic relationships for each networked computer using agent modules located on each networked computer that keeps track of the current location of a cursor based upon the geographic relationships. If the current cursor position corresponds to another networked computer, an agent module blocks incoming input streams so that they are not processed by the local computer, and transmits the input device signals to a remote agent module corresponding to the remote networked computer. The remote computer agent module injects the input device instructions into the remote system, which causes the remote computer to process the input stream from the local computer.

21 Claims, 12 Drawing Sheets

U.S. PATENT DOCUMENTS

| | | | |
|---|---|---|---|
| 6,571,141 B1 | 5/2003 | Brown | |
| 6,587,125 B1* | 7/2003 | Paroz | 715/740 |
| 6,620,045 B2 | 9/2003 | Berman et al. | |
| 6,622,299 B1 | 9/2003 | Santosuosso et al. | |
| 6,662,207 B2* | 12/2003 | Kawamura et al. | 709/202 |
| 6,664,925 B1 | 12/2003 | Moore et al. | |
| 6,671,869 B2 | 12/2003 | Davidson et al. | |
| 6,706,571 B1 | 3/2004 | Yu et al. | |
| 6,709,331 B2 | 3/2004 | Berman | |
| 6,724,384 B2 | 4/2004 | Weingarten | |
| 6,725,281 B1 | 4/2004 | Zintel et al. | |
| 6,764,884 B1 | 7/2004 | Yu et al. | |
| 6,858,478 B2 | 2/2005 | Chau et al. | |
| 6,921,982 B2 | 7/2005 | Joshi et al. | |
| 6,983,328 B2* | 1/2006 | Beged-Dov et al. | 709/230 |
| 7,171,444 B2* | 1/2007 | Deshpande | 709/203 |
| 2002/0166838 A1 | 11/2002 | Nagarajan | |
| 2003/0122186 A1 | 7/2003 | Sekigawa et al. | |
| 2003/0151077 A1 | 8/2003 | Mathew et al. | |
| 2004/0036118 A1 | 2/2004 | Adadeer et al. | |
| 2004/0036127 A1 | 2/2004 | Chau et al. | |
| 2004/0092062 A1 | 5/2004 | Ahmed et al. | |
| 2004/0092067 A1 | 5/2004 | Hanafi et al. | |
| 2004/0094807 A1 | 5/2004 | Chau et al. | |
| 2004/0110097 A1 | 6/2004 | Ahmed et al. | |
| 2004/0126975 A1 | 7/2004 | Ahmed et al. | |
| 2004/0166642 A1 | 8/2004 | Chen et al. | |
| 2004/0180491 A1 | 9/2004 | Arai et al. | |
| 2004/0191980 A1 | 9/2004 | Rios et al. | |
| 2004/0198003 A1 | 10/2004 | Yeo et al. | |
| 2004/0238887 A1 | 12/2004 | Nihey | |
| 2004/0262699 A1 | 12/2004 | Rios et al. | |
| 2005/0127362 A1 | 6/2005 | Zhang et al. | |
| 2005/0145941 A1 | 7/2005 | Bedell et al. | |

OTHER PUBLICATIONS

International Search Report PCT/US2005/035380, mailed Feb. 13, 2006 (14 pgs.).

International Search Report PCT/US2005/037169, mailed Feb. 23, 2006 (11 pgs.).

Sung Min Kim, et al., A Novel Multi-channel Field Effect Transistr (McFET) on Bulk Si for High Performance Sub-80nm Application, IEDM 04-639, 2004 IEEE, pp. 27.4.1-27.4.4.

Yang-Kyu Choi, et al., "A Spacer Patterning Technology for Nanoscale CMOS" IEEE Transactions on Electron Devices, vol. 49, No. 3, Mar. 2002, pp. 436-441.

W. Xiong, et al., "Corner Effect in Multiple-Gate SOI MOSFETs" 2003 IEEE, pp. 111-113.

Weize Xiong, et al., "Improvement of FinFET Electrical Characteristics by Hydrogen Annealing" IEEE Electron Device Letters, vol. 25, No. 8, Aug. 2004, XP-001198998, pp. 541-543.

Fu-Liang Yang, et al., "5nm-Gate Nanowire FinFET" 2004 Symposium on VLSI Technology Digest of Technical Papers, 2004 IEEE, pp. 196-197.

T. M. Mayer, et al., "Chemical Vapor Deposition of Fluoroalkylsilane Monolayer Films for Adhesion Control in Microelectromechanical Systems" 2000 American Vacuum Society B 18(5), Sep./Oct. 2000, pp. 2433-2440.

S. Ward, et al., Pebbles: A Software Component System, Mar. 2002, pp. 107-108, MIT Laboratory for Computer Science.

Pebbles Software, http://www-2.cs.cmu.edu/~pebbles/overview/software.html as viewed on Aug. 28, 2003, 10 pages.

R. Miller, Remote ClipBook and RmoteClipHack, http://www-2.cs.cmu.edu/~pebbles/clipboard/index.html as viewed on Aug. 28, 2003, 6 pages.

Carnegie Mellon Pebbles Project, http://www.rose-hulman.edu/TSC/mobility/pocket_pc/software_documentation/carnrgie_mellon_pebbles_project/ as viewed on Aug. 28, 2003, 1 page.

* cited by examiner

FRAMEWORK FOR USER INTERACTION WITH MULTIPLE NETWORK DEVICES

TECHNICAL FIELD

This invention is related to control of computers, and more specifically to controlling computers via an input device.

BACKGROUND OF THE INVENTION

The day-to-day experience of many knowledge workers typically consists of exposure to a number of computers. For example, a user may have a main office machine, a mobile machine (such as a laptop or PDA), a home machine, and the occasional foreign machines (e.g., airport kiosks, conference room PC, other user machines). Despite the fact that the same person may be using each of these machines, the machines themselves are ignorant of the each other.

In some situations, the user may wish to interact with multiple computers in a manner such that work created on one machine can be transmitted to another machine without requiring traditional data transfer mechanisms (e.g., portable storage devices such as drives or memory, or email) or an explicit copy step. For example, a user may wish to show a co-worker a word processing document in progress.

In other situations, a user may wish to interact with multiple computers to provide the user with access to various input and output devices at the same time, even if they are associated with different computers. For example, the user may wish to display a presentation on a conference room computer by manipulating a laptop or handheld portable computing device, e.g., PDA.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, comprises a framework for providing user interaction with one or more other networked computing devices through a first computing device. User interaction with multiple networked machines provides an improved user experience and increases overall user productivity. The invention provides an agent component that facilitates manual and automatic configuration of networked computer devices such that each of the networked computing devices input and output devices interact with one another in a prescribed manner.

In another aspect thereof, the user manually configures the agent component resident on a local computing system to facilitate switching of the local input device signals to a remote computing system such that the agent of the remote computing system allows the local input device(s) to control the remote computing system. The remote input devices can also be used to control the remote computing system at the same time as the local computing devices. When the user manually signals the remote computing system that local input device control is to be switched back to the local computing system, the remote computing system signals the remote agent, the remote agent signals the local agent, and the local agent switches the local input device signals to the local computing device inputs.

One method of manually switching local control to remote control is accomplished by the user pressing a button or a key (e.g., on a keyboard, or a mouse button) or voicing a command, in response to which the local agent switches local input device control to the remote computing system. Another method of manual switching that can be employed alternatively to or in combination with the above method, includes configuring a switching location of the local user interface (UI) to automatically respond to the presence of a user interface pointer in that location. Thus, when the user moves the pointer to the switching location, the local computing system signals the local agent to perform the switching function to switch the local input device signals to the remote computing system. The local agent signals the remote agent, and the remote agent routes the local input device signals to the inputs of the remote system. Similarly, manual signaling to switch remote control back to local control can be accomplished by pressing a different button or key of the local input device and/or by configuring one or more locations of the remote user interface to automatically respond to the presence of a user interface pointer in those locations. When the pointer and the location coincide, the remote computing system signals the remote agent, the remote agent signals the local agent, and the local agent no longer routes the local input device signals to the remote computing system, but routes them only to the local computing system.

In yet another aspect thereof, the remote control aspect by the local computing system only occurs if the remote computing system has been properly authenticated as a member of a group of systems authorized to take part in such an exchange. This can be done manually or automatically. If manually, when the remote system is brought into a geographical area of the local system, the remote system is connected to the network, and manually configured in accordance with a network database to be a member of the group such that remote control can be performed. If automatically, when the remote system is brought into the area of the local system, the remote system automatically authenticates to the network. The network further authenticates the remote system against the network database of authorized members of the group, and then allows the local and remote agents to communicate to facilitate the control aspects of the present invention.

In still another aspect of the present invention, the relative location of the remote computing system to the local computing system determines where the one or more switching locations of the user interface will be created. This can be determined manually or automatically. The remote computing system can be placed to the left of the local system, to the right, above, below, to the left and above, etc. Accordingly, it is intuitive that the UI switching location be created near the physical location of the remote computing system. Manually, the user will then configure the local computing system to include the switching location approximately on an imaginary line that extends, generally, from the center of the UI to the remote computing system.

In yet another aspect thereof, the location of the remote computing system relative to the local computing system is determined automatically. This can be accomplished using, for example, a wireless triangulation system that can sense a unique tag of each of the computing systems, which tag is associated with a different physical location. The local computing system in cooperation with the local agent can then further automatically create the switching location on the UI for the user. In either case, the local computing system and the local agent will then respond when the pointer and the switching location coincide, and switch the local input device control to the remote system. Similarly, now that the relative locations are known, the remote computing system will have a corresponding remote switching UI location that can be manually or automatically created such that the user can disable remote control by moving the remote UI pointer to the remote UI switching location, which causes the remote system to signal the remote agent. The remote agent then signals the local agent to disable switching of the local input signals to the remote computing system.

In a robust implementation, the full geometric relationship of the remote computing system to the local computing system can be automatically determined. That is, whether the remote computing system is placed to the left of the local system, to the right, above, below, to the left and above, facing the local system, etc. This further facilitates the automatic configuration of the corresponding UI switching locations on both the local and remote systems.

In another aspect thereof, the present invention utilizes extended copy and paste functionality through the computing device system clipboard, and in combination with the agent component, provides the capability to share content (e.g., text, images, multimedia, etc.) between networked computers or systems. In a similar manner to current copy/paste implementations, the user selects the content to be copied, performs a copy operation on the content, and the selected content is automatically copied to the system clipboard on the local computing system. In an automated implementation, the local agent, sensing that the local clipboard has the content data, signals the remote computing system that clipboard data is forthcoming. The local clipboard data is then transmitted to the remote agent, and then to the remote clipboard. An application of the remote system can then access the remote clipboard data, and manipulate the data, as desired (e.g., open in a document, and save to a different location). In a manual implementation, the local agent, sensing that the local clipboard has the content data, signals the user that clipboard content is available for transmission. The user then initiates transmission of the local clipboard data to the remote computing system.

To facilitate the data transfer, the local agent encapsulates the local clipboard content and transmits the content to the remote agent module. The encapsulated content can include various attributes that describe characteristics about the content such as content types, restrictions, etc. The remote agent verifies whether the encapsulated content can be copied to the remote clipboard. In one embodiment, the encapsulated content is transferable, as the remote agent places the content on the clipboard of the remote machine for manipulation.

In another aspect of the present invention, the encapsulated copied content can be transmitted to some or all networked computers. Alternatively, the encapsulated contented can be transmitted to any number of networked computers that are currently being used. Computing system authentication occurs in the same manner as described above, so that every remote computing system must be authenticated as a member of a group authorized to receive the clipboard data.

In yet another aspect thereof, a modified user interface is provided via the agent module that facilitates interaction between a networked computer and a mobile and/or handheld computing device having a stylus-based input device (e.g., PDA).

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
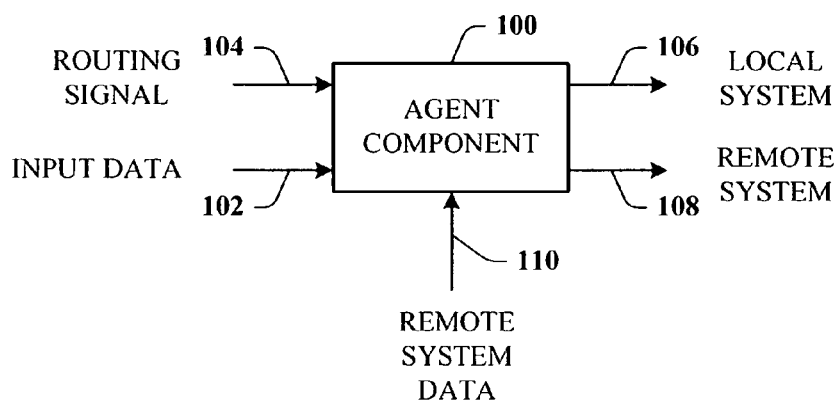
FIG. 1 illustrates an agent component that facilitates the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The disclosed invention, in one implementation thereof, provides a system that automatically replicates files between at least two user-computing devices to provide a seamless data processing experience. Once the user document (or data) structure is automatically updated on each machine, the user no longer has to remember how document structures differ from machine to machine. Replicating some or all of the user documents eliminates the need for the user to decide which files are needed on which machine, and makes explicit any document versioning issues.

In another implementation, user computing devices can be grouped such that when members of the device group are physically close together, the devices can be linked such that one or more of the input devices of one machine can be used with each of the other computing devices. Virtual screen connections allow the user to use, for example, a mouse, of a device to which it is physically connected, to control the cursor (or pointer) for any of the other devices. Having the capability to forward all input device data allows, for example, a keyboard to follow the mouse location reducing the need for an external keyboard for all devices. For example, when a PocketPC device is docked and in the group of devices, a keyboard of a main machine can be used in accordance with the present invention to speed data entry into the PocketPC. Similarly, the user can utilize the same mouse and keyboard of a local machine to control a laptop grouped in communication with the local machine—without having to connect any new cables to the laptop in order to use the laptop.

Similar to the sharing of input devices, output devices can be shared. Using Remote Desktop Protocols (RDP) a running application can be wrapped and transmitted to another computer to be displayed on the available screens. This allows an image displayed on a laptop to be displayed on the desktop computer, which typically has a display with higher resolution and better color palette.

Moreover, new user interfaces can be built that take advantage of the knowledge of other owned devices, for both input and output. For example, a docked PocketPC can provide a continuously available task switcher or start menu for the computer to which it is docked. Furthermore, a section of one screen could be replicated on another device screen to provide a "ScreenCut". Consider that if one machine was used for editing a web page, a second machine can be used to view the result in a browser. The user can drag a rectangle around the browser Reload button, and copy it to the editing machine. On the editing machine, this button shows up as a floating palette that is updated with the original region and forwards all mouse or keyboard events. Now, as the user works on the editing machine, he or she can cause the viewing machine to reload the web page just by clicking on this ScreenCut. The floating palette could be positioned anywhere that is convenient for the user and even scaled to make the duplicated elements easier to work with. In the end, the disclosed invention facilitates these capabilities such that either the application or the user can control this.

Consider, for example, a POWERPOINT brand of presentation program by Microsoft Corporation, operating across all available devices. The editing windows can be placed on the various display desktops, using shortcuts to common operations on the docked PocketPC, with the final view of the current slide presented on the nearby laptop. In addition, a user can place task-related items on multiple screens just as they would position paper piles on their desktop, leveraging the excellent spatial memory abilities of the user.

Traditionally, the user must manually select an output device and location for data monitoring tasks. An exception to this is MESSENGER, by Microsoft Corporation, which automatically selects the computing device that was most recently accessed. Once there is a model of the devices available, the system anticipates device changes and makes suggestions. Additionally, the user can express preferences in a meaningful fashion. Messenger can be set to always stay active on the laptop and only run on the desktop when the laptop is powered off. A multimedia file can be presented on the laptop, but the sound could be produced using the speakers of the main machine. The simple act of logging onto one network versus another can change everything from where the music is playing, to which e-mail and messaging accounts the user is monitoring.

Once a collection of trusted machines is defined, there now also exists a collection of machines that are not in that group (i.e., "untrusted"). The concept of categorizing a user as a "visitor" facilitates safely doing some of the previously mentioned interaction with an "untrusted" machine. Two common situations include bringing a laptop into a conference room where it should interact with both public machines and other laptops, and interacting with a colleague's machine remotely. Visitor connections, which are temporary connections, allow a person to walk into their colleague's office and easily bring up the web page they were just viewing, or quickly share a section of their screen so a paragraph can be reviewed and edited live, instead of mailing copies of the document back and forth. In order to maintain data security, the capabilities of these connections are limited. However, even in this limited form, the user benefits greatly by the improved sharing capabilities.

Referring now to FIG. 1, there is illustrated an agent component 100 that facilitates the present invention. The agent component 100 is software that is installed (or encoded in hardware) on a local computing system that receives one or more inputs and switches between multiple outputs in order to implement the novel aspects of the present invention. A first input 102 receives input data from at least one input mechanism that is either hardware (e.g., physically attached to or wirelessly associated with the local computing system) and/or software from a system process, and that communicates the data to the local computing system. The hardware input data can be received from a hardware device such as mouse, trackball, touch pad, pointing stick, touch screen, keyboard, stylus-based interactive pointing device, or any other suitable input device that facilitates interactive input by a user to control pointer (or cursor) movement of the local computing system. The input data 102 can also be the data related to a software process, such as the system clipboard, where the process data is received into a memory or temporary storage area for access and transmission from the local computing system to a remote computing system.

A second input 104 facilitates the receipt of a routing signal (or trigger signal) that is processed by the agent component 100 to determine when to route the input data between multiple outputs, here, two outputs: a local system output 106 that routes the local input data to the local computing system for control thereof or processing thereby; and, a remote system output 108 that facilitates routing of the local input data to the remote computing system for control thereof or processing thereby. By default, the agent component 100 routes the input data to the local computing system for processing and control thereof. In one implementation, the routing signal is derived from a hardware input device such that the user controls the input device to cause an associated user interface (UI) pointer to hover over switching location data represented on an x/y coordinate system of the UI. Each display element (i.e., picture element or pixel) is mapped such that the location of the pointer on the UI is known. If the pointer is moved to a zone of pixels that are mapped to indicate that the user desires to effect control of the remote system, the agent component 100 will route the input device data to the remote system output 108, which then allows for control of the remote computing system.

In another implementation, a keystroke or combination of keystrokes from a keyboard or buttons of a mouse may trigger the agent 100 to route the input device data. In still another implementation, voice commands may be employed singularly or in combination with other input signals to cause the agent 100 to route the input device data.

A remote agent in the remote system works with the remote system programs to merge local input device signals with the remote system input device signals to allow the user at the local system to control the remote system using input devices of the local system and/or the remote system.

The agent component 100 also receives as a third input 110 of remote system data that represents identity (or authorization) information and configuration data of a remote computing system (not shown) associated with the user. This ensures that the agent component 100 can only switch access to a verified remote computing device of the user.

Where the input data is from a local software process, the agent 100 facilitates transmission of the data to the remote computing system. The present invention utilizes extended copy and paste functionality through a computing system clipboard, and in combination with the agent component 100, provides the capability to share content (e.g., text, images, multimedia, etc.) between networked computers or devices. In a similar manner to current copy/paste implementations, the user selects the content to be copied (e.g., using a word processing application to copy document text), performs a copy operation on the content, and the selected content is automatically copied to the local clipboard on the local computing system. In an automated implementation, the local agent 100, sensing that the local clipboard has the content data, signals the remote computing system that clipboard data is forthcoming. The local clipboard data is then transmitted to the remote agent, and then to the remote clipboard. An application of the remote system can then access the remote clipboard data, and manipulate the data, as desired (e.g., open in a document, and save to a different location). In a manual implementation, the local agent, sensing that the local clipboard has the content data, signals the user that clipboard content is available for transmission. The user then initiates transmission of the local clipboard data to the remote computing system.

In another implementation, the agent component 100 facilitates the use of a modified UI, which is employed when the screens or displays of the computing devices are significantly different in size, such user interaction is impacted. The presentation of information of a large computing system display is more difficult on a smaller device display. One example includes interaction between a networked computer and a mobile and/or handheld computing device having a stylus-based input device (e.g., a personal data assistant (PDA). Such a disparity is can be manually or automatically accommodated using the agent component 100. When the agent is made aware of the disparity in the systems, the agent facilitates activation of the modified UI for use with the smaller device.

The agent 100 is made aware of the disparity via the authentication schema described herein, where a network database includes configuration information of the possible devices that can be used by the user in accordance with the novel aspects of the present invention. When the remote computing system authenticates to the network (i.e., at least the database), the corresponding remote device configuration information is retrieved and processed such that the agent 100 employs any number of the novel functions, i.e., remote computing system control, clipboard data transfer, and screen emulation.

The agent component 100 essentially performs a logical AND operation on the second and third inputs (104 and 110). If the routing signal at the second input 104 corresponds to the pointer hovering in a zone associated with the user desire to route data remotely, and the remote system data verifies that the remote system is associated with the user, the agent component 100 routes the input device data at input 102 to the remote system output 108 such that the user can now control the remote system. Otherwise, if the routing signal at the second input 104 indicates that the user desires to control the remote system, but the remote system data at the third input 110 indicates that the user is not allowed access thereto, the agent 100 will continue to route the input device data to the local system output for processing by the local system.

Figure 2:
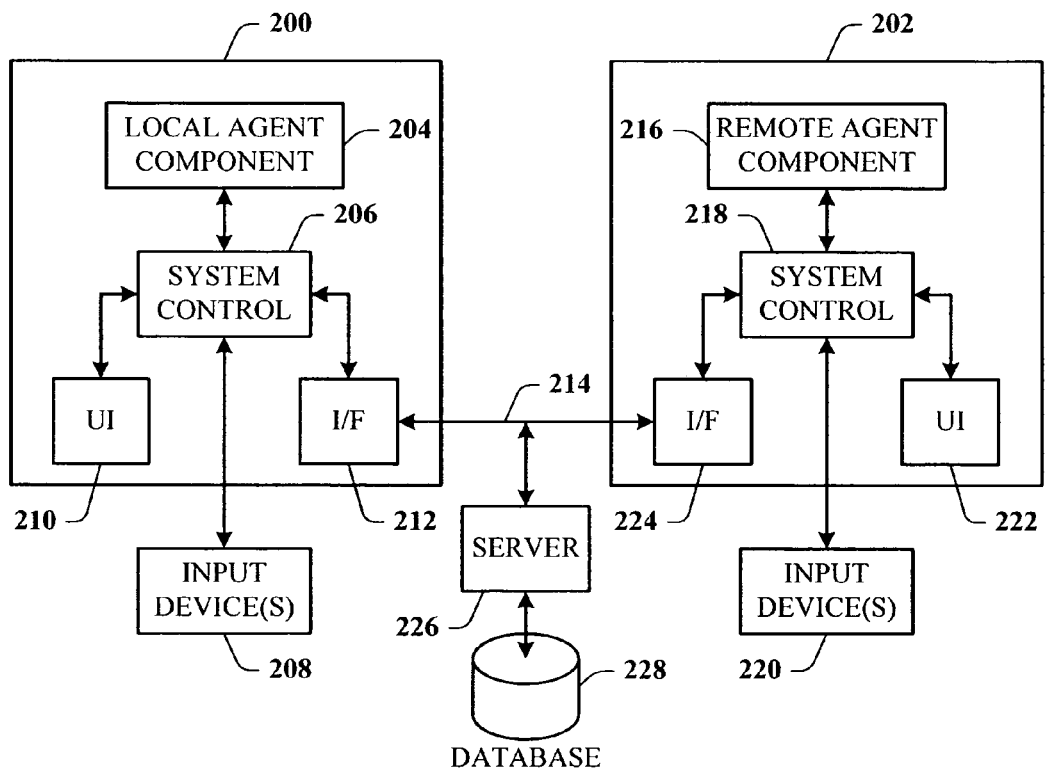
FIG. 2 illustrates a more detailed block diagram of a head-to-head arrangement of a local computing system and a remote computing system operating in accordance with the present invention.

Referring now to FIG. 2, there is illustrated a more detailed block diagram of a head-to-head arrangement of a local computing system 200 and a remote computing system 202 operating in accordance with the present invention. The local system 200 includes a local agent component 204 operating in accordance at least with the characteristics of agent 100 of FIG. 1. The local system 200 also includes the following: a local system control block 206 that monitors and controls all components of the local system 200; one or more local input devices 208 connected to the control block 206 for inputting the input device data; a local UI 210 connected to the system block 206 that facilitates user interaction with the local system 200, which UI 210 presents information in the form of text, graphics, and/or images; and a network interface 212 connected to the system block 206 to accommodate wired and/or wireless communication with a network 214. The local agent 204 also connects to the system control block 206 to access UI data related to the position of the pointer, which pointer is under control of at least one of the input devices 208 the data of which is processed by the system control block 206.

The remote computing system 202 includes similar software and hardware, including a remote agent component 216 operating in accordance at least with the agent of FIG. 1. The remote system 202 also includes the following: a remote system control block 218 that monitors and controls all components of the remote system 202; one or more remote input devices 220 connected to the control block 218 for inputting the input device data; a remote UI 222 connected to the system block 218 that facilitates user interaction with the remote device 220, which UI 222 presents information in the form of text, graphics, and/or images; and a network interface 224 connected to the system block 218 to accommodate wired and/or wireless communication with the network 214. The remote agent 216 also connects to the system control block 218 to access UI data related to the position of the pointer, which pointer is under control of at least one of the input devices 220 and the data of which is processed by the system control block 218.

Disposed in wired or wireless communication with the network 214 is a server 226 with a database 228 of users and information associated with user computing systems. When the remote system 202 is brought into the working area of the local system 200, automatic network connection and communication can occur such that the network systems are now made aware of the presence of the remote system 202. This can occur by the remote system 202 conforming to network authentication services upon connecting to the network 214 or other suitable network awareness technologies. Of course, in a peer-to-peer network implementation, the server 226 and server database 228 are not required. However, the storage functions previously provided by the server database 228 are now provided by the storage mechanisms of the peer machines. Either of the local or remote agents (204 and 216) can be configured to automatically sense such a peer-to-peer network connection, and either require or not require verification of the other peer computing system.

In order to provide a seamless experience in accordance with the present invention, the database 228 can include a file system that replicates files between user machines. Once the user document structure is automatically updated for each computing system, the user no longer has to remember the various document structures and how they differ from system to system. Replicating all user documents eliminates the need for the user to decide which files are needed on which machine, and makes explicit any document versioning issues. This consistency reduces the amount of effort required to locate a file. In addition, many of the user preferences are represented by files on each machine. For example, in a WINDOWS brand operating system environment, the Favorites folder, Recent documents folder and the Start Menu can all be unified in the process. Shared resources also include the copy/paste clipboard. Issues related to application licenses, privacy and unreachable network resources (which can result in a document being forked) can be considered using a replicated file system in order to maintain the user experience. Specific files can be designated for shared access between the systems.

Other information can be stored in the database 228 including computing system configuration data such that when the remote system 202 is accessed from the local system 200, the configuration data is automatically accessed or made available to the local agent 204 from the database 228 and employed to enhance the user experience. This configuration data can include, but is not limited to the use of hot keys for automatically launching and/or manipulating applications, desktop orientation and color schemes, input device settings that are suitable for using the remote computing system, and many other personal user profile settings and configurations. This is also where physical information needs to be registered and maintained.

In operation, the user in control of at least one of the local input devices 208 moves the associated pointer on the local UI 210 such that the pointer hovers or impacts a switching location area of the UI 210 that facilitates triggering initiation of the routing signal. The local agent 204 performs a check with the server 226 to find the appropriate remote user computing system, the remote computing system 202 with which to facilitate routing of the input device data. Once verified, the local agent 204 communicates over the network 214 to the remote agent 216 (this can also be the peer-to-peer arrangement) to pass control of the local input device thereto. When the user desires to return to the local system 200, he or she moves the pointer to a remote switching area of the remote UI 222 associated with triggering a return routing signal of the remote agent 216. The remote agent 216 then sends a signal to the local agent 204 to reroute the input device data to the local system.

The local UI 210 and remote UI 222 both function as a traditional user interface such that the location of a pointer presented is confined within viewable bounds of a computer display. The UI can include at least a graphical desktop of an operating system and any windows that can be presented to facilitate interactive operations by a user with the operating system and applications. Thus, as the user manipulates an input device, a corresponding pointer will be presented, the location of which on the UI indicates the intent of the user to move from accessing the local computing system to accessing the remote computing system. Certain areas of the UI can be designated for generating the routing signal that initiates switching from local to remote and remote to local. These areas can be designated during installation or subsequent setup of the agent component (204 and 216). For example, if the remote system 202 is located to the right of the local system 200, designating any number of pixels along the right side of the UI of the local system can indicate auto-switching of the local input device data to the remote system 202 such that it would appear normally to the user that the pointer simply moves directly onto the UI of the remote system 202 without pause or hesitation. On the remote system 202, any number of pixels along the left side of the UI can be designated to trigger the remote agent 216 to signal the local agent 204 to route the input device data locally. It would then appear to the user that the pointer simply reaches the left side if the remote UI 222 and disappears, reappearing on the local UI 210.

The user can manually configure the local agent component 204 to facilitate switching of the local input device signals to the remote computing system such that the remote agent 216 of the remote computing system 202 allows the local input device(s) to control the remote computing system 202. The remote input devices 220 can also be used to control the remote computing device 202 at the same time as the local computing devices 208. When the user manually signals the remote computing system 202 that local input device control is to be switched back to the local computing system 200, the remote computing system 202 signals the remote agent 216, the remote agent 216 signals the local agent 204, and the local agent 204 switches the local input device signals to the local computing system inputs.

One method of manually switching local control to remote control is accomplished by the user pressing a button or a key (e.g., on a keyboard, or a mouse button) or voicing a command, in response to which the local agent 204 switches local input device control to the remote computing system 202. Another method of manual switching that can be employed alternatively to or in combination with the above method, includes configuring a switching location of the local user interface (UI) to automatically respond to the presence of a user interface pointer in that location. Thus, when the user moves the pointer to the switching location, the local computing system 200 signals the local agent 204 to perform the switching function to switch the local input device signals to the remote computing system 202. The local agent 204 signals the remote agent 216, and the remote agent 216 routes the local input device signals to the inputs of the remote system 202. Similarly, manual signaling to switch remote control back to local control can be accomplished by pressing a different button or key of the local input device 208 and/or by configuring one or more locations of the remote user interface to automatically respond to the presence of a user interface pointer in those locations. When the pointer and the location coincide, the remote computing system 202 signals the remote agent 216, the remote agent 216 signals the local agent 204, and the local agent 204 no longer routes the local input device signals to the remote computing system 202, but routes them only to the local computing system 200.

In another illustrative example, the user utilizes an attached mouse on the local computing system 200 to manipulate a cursor on an attached display screen. As the cursor reaches the right edge of the display screen, the cursor appears on the display screen of the remote system. The user can continue to manipulate the cursor with the local device mouse or can switch to an attached mouse of the remote system.

The invention finds application to a number of other input and output devices, including microphones, joysticks, peripheral devices (e.g., printers and external drives), visual control devices, etc., to name just a few.

Figure 3:
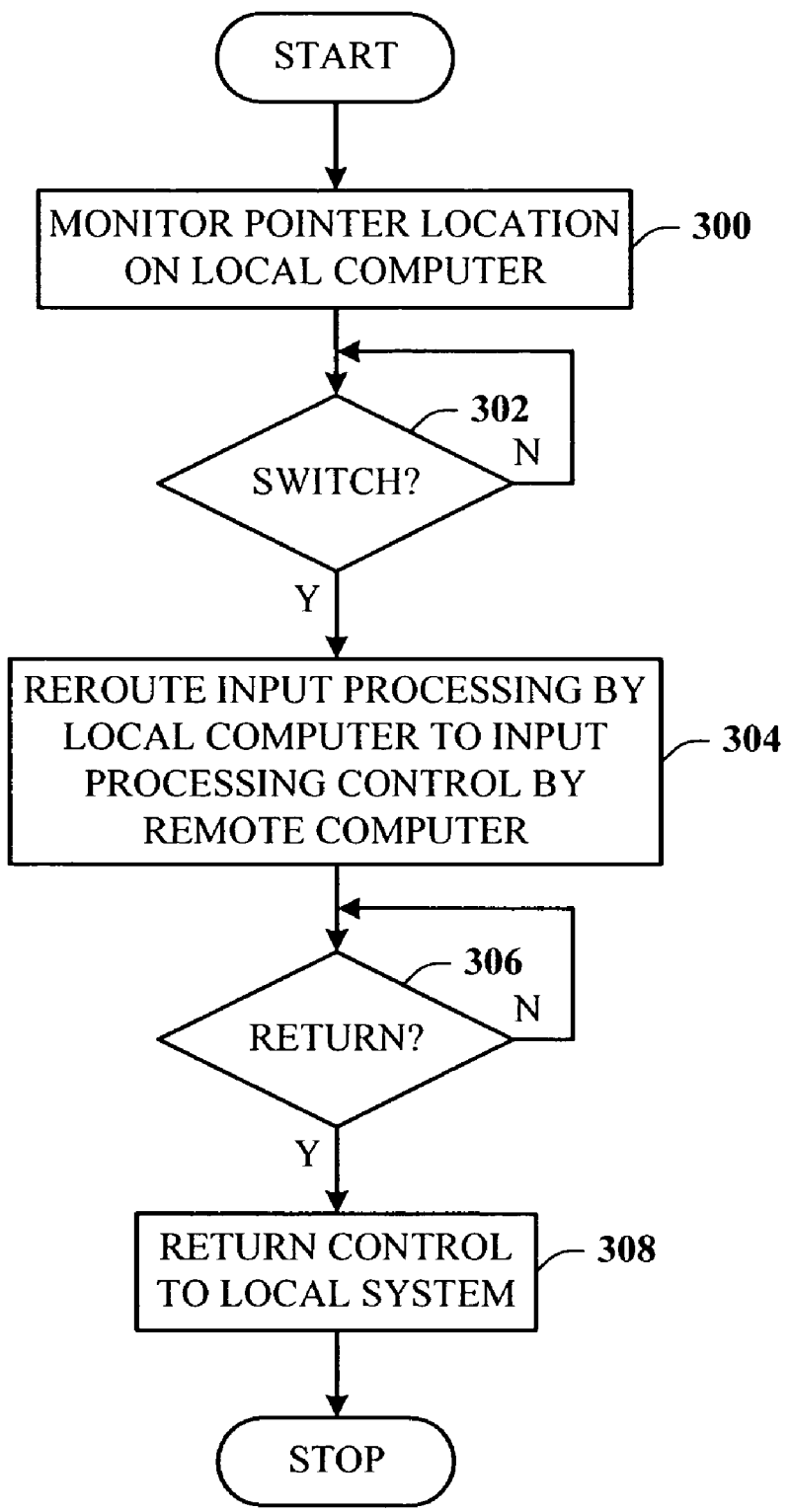
FIG. 3 illustrates a flow chart of a general process for implementation and utilization input device control in accordance with the present invention.

Referring now to FIG. 3, there is illustrated a flow chart of a general process for implementation and utilization input device control in accordance with the present invention. While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 300, a location of a pointer associated with a local input device is monitored. At 302, the local agent determines if a routing signal has been received to initiate routing of input device data to a remote system. If NO, flow is back to the input of 302 to continue monitoring the pointer location. If YES, flow is from 302 to 304 to reroute processing of the input device data by the local system, and route the data to the remote agent of the remote system. The remote agent also monitors the location of the remote pointer to determine when to return control to the local computing system. If return is not indicated, flow is from 306 back to its input to continue monitoring for the return routing signal. If return is indicated, flow is from 306 to 308 to return input device data processing to the local system. The process then reaches a Stop block.

Figure 4:
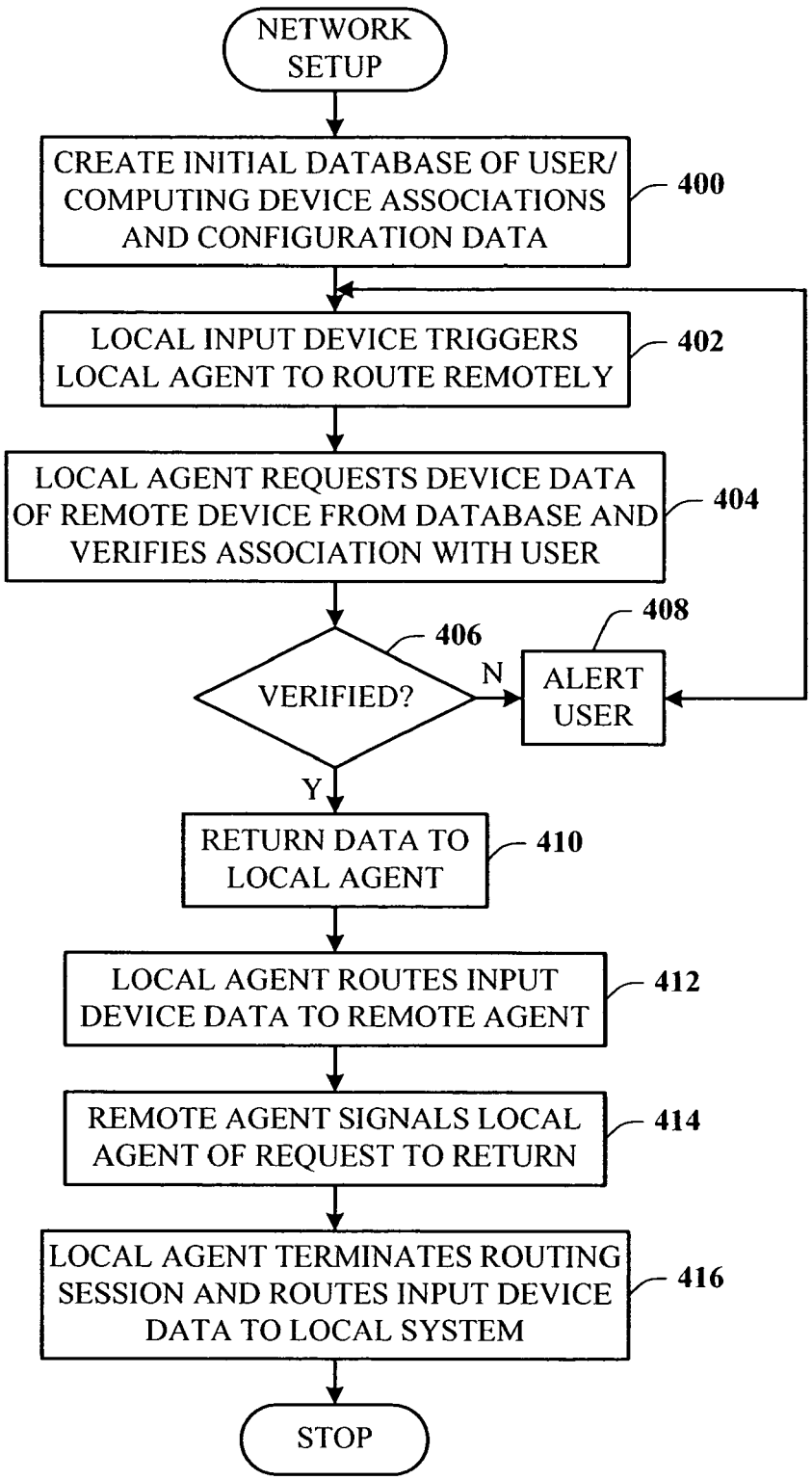
FIG. 4 illustrates a more detailed flow chart of a process for configuring and operating the present invention.

Referring now to FIG. 4, there is illustrated a more detailed flow chart of a process for configuring and operating the present invention. At 400, a database of user and computing system associations is created. The database can also include configuration data, location data, and user profile data that can be implemented when the user interacts with the remote system. At 402, the local input device is maneuvered on the UI to trigger the routing signal, the receipt of which causes the local agent to route the input device data to the remote agent. At 404, the local agent requests remote device data of the remote system from the database and verifies that the system is associated with the user. If the remote system fails verification, flow is from 406 to 408 where the user is alerted, and flow loops back to the input of 402. If the remote system is verified, flow is from 406 to 410 to return the device data to the local agent. At 412, the local agent routes the input device data to the remote agent. When finished with the remote device, the remote agent signals the local agent to reroute the input device data locally, as indicated at 414. At 416, the local agent terminates the remote routing session and routes the input device data locally. The process then reaches a Stop block.

Figure 5:
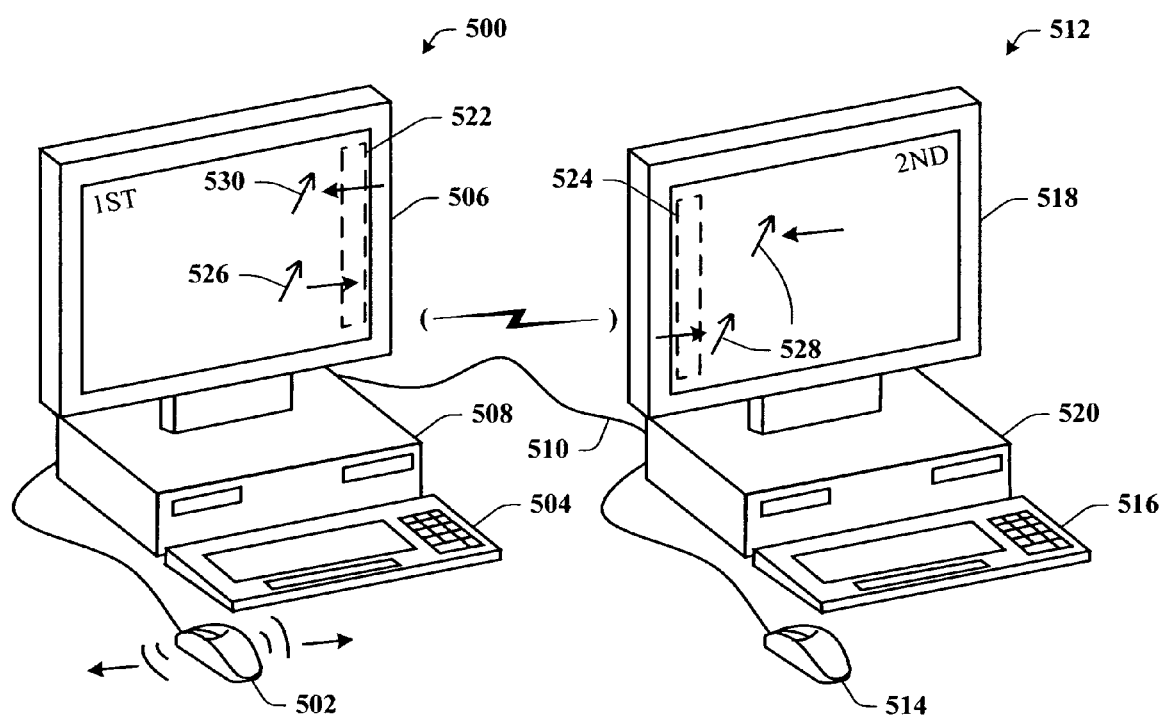
FIG. 5 illustrates an implementation of the novel aspects of the present invention in accordance with two desktop computer systems.

Referring now to FIG. 5, there is illustrated an implementation of the novel aspects of the present invention in accordance with two desktop computer systems. A first (or local) computer system 500 includes a mouse input device 502, a keyboard 504, a display 506, and a chassis 508 that houses the CPU, I/O interface devices, peripheral devices, data storage, power supply, and memory. The computer 500 is disposed on a network 510, along with a second (or remote) computer system 512. The second computer 512 includes a mouse input device 514, a keyboard 516, a display 518, an agent component, and a chassis 520 that houses the CPU, I/O interface devices, peripheral devices, data storage, power supply, and memory.

When installed, the agent of the first system 500 is configured to associate a switching display area 522 with routing of local input device data to the second computer 512. The second system 512 has a similar switching area 524 designated for signaling a desire to change routing of the local input device data. The area 524 is also configured upon installation of the agent of the second computer 512 to trigger a signal that returns processing of the local input device data to the first computer 500. This can be performed manually or automatically. Manual configuration can be by the user accessing a graphical representation of the UI and designating one or more areas thereof for activating switching of the input device signals. Automatic configuration can include configuring default areas of the UI, or presenting a graphical icon that the user drags to a location, and confirms to the system that the location(s) have been selected. Thereafter, when the user moves the mouse 502 such that a corresponding pointer 526 moves into the area 522, the system can require that the user interact and manually affirm that remote control is desired. Manual affirmation can include pressing a button, key, or a combination thereof for the keyboard and mouse. Alternatively, the agent automatically (without user intervention) routes the mouse data from the first computer 500 over the network 510 to the agent of the second computer 512, which agent communicates with the control electronics of the second computer 512 to present the pointer, now pointer 528, on the second system display 518. The user can then manipulate programs and devices of the second computer 512 using the mouse 502 of the first computer 500, the keyboard 504, the mouse 514 and/or the keyboard 516. As long as the pointer 528 is used outside of the area 524, the user will retain control of programs and devices associated with the second system 512, from the first system 500.

When the pointer 528 is brought back into the area 524, the agent of the second computer 512 signals the agent of the first computer 500 via the network 510 (which can be a wired or wireless network) to reroute the input device data for processing only on the first computer 500. Thus, pointer 528 becomes pointer 530 (formerly pointer 526), which reappears back on the display 506.

Note that in more robust implementations, the direction of the pointer movement can be used in combination with the location of the pointer to initiate rerouting of the input device data by the agent. Thus, the user may be able to rest the pointer in the areas (522 and 524) without the rerouting of data occurring. Still further, the velocity and/or acceleration of the pointer alone or in combination with the pointer location and/or direction of movement may be used as an indicator as to whether the user desires the rerouting of the input device data.

In one implementation, the relative location of the second computing system 512 to the first computing system 500 is determined and the one or more switching locations 522 of the user interface will be created. This can be determined manually or automatically. Manual configuration can involve presenting a graphical representation of the first and second systems, such that the user simply drags the second system graphic to a location relative to the first system graphic that reflects the approximate physical orientation of the systems. In a more robust implementation, the full geometric orientation can be manually configured, such that the user can also input to the first system 500 that the second system 512 may be facing the first system 500. The second computing system 512 can be placed to the left of the first system 500, to the right, above, below, to the left and above, etc. Accordingly, it is intuitive that the UI switching location 522 be created near the physical location or in the direction of the second computing system 512. Manually, the user will then configure the first computing system 500 to include the switching location 512 approximately on an imaginary line that extends, generally, from the center of the UI of the first system 500 to the second computing system 512.

The location of the second computing system 512 relative to the first computing system 500 is determined automatically. This can be accomplished using, for example, a wireless triangulation system that can sense a unique tag (not shown) of each of the computing systems (500 and 512), which tag is determined to be associated with a different physical location of the respective systems. The first computing system 500 in cooperation with the local agent can then further automatically create the switching location 522 on the UI of the first system 500 for the user. In either case, the first computing system 500 and the local agent will then respond when the pointer 526 and the switching location 522 coincide, and switch the local input device control to the second system 512. Similarly, now that the relative locations are known, the second computing system 512 will have a corresponding remote switching UI location 524 that can be manually or automatically created such that the user can disable remote control by moving the remote UI pointer 528 to the remote UI switching location 524, which causes the second system 512 to signal the remote agent. The remote agent then signals the local agent to disable switching of the local input signals to the second computing system 512.

In a more robust implementation, the full geometric relationship of the second computing system 512 to the first computing system 500 can be automatically determined. That is, whether the second computing system 512 is placed to the left of the first system 500, to the right, above, below, to the left and above, facing the first system 500, etc. This further facilitates the automatic configuration of the corresponding UI switching locations on both the first and second systems (500 and 512).

Figure 6:
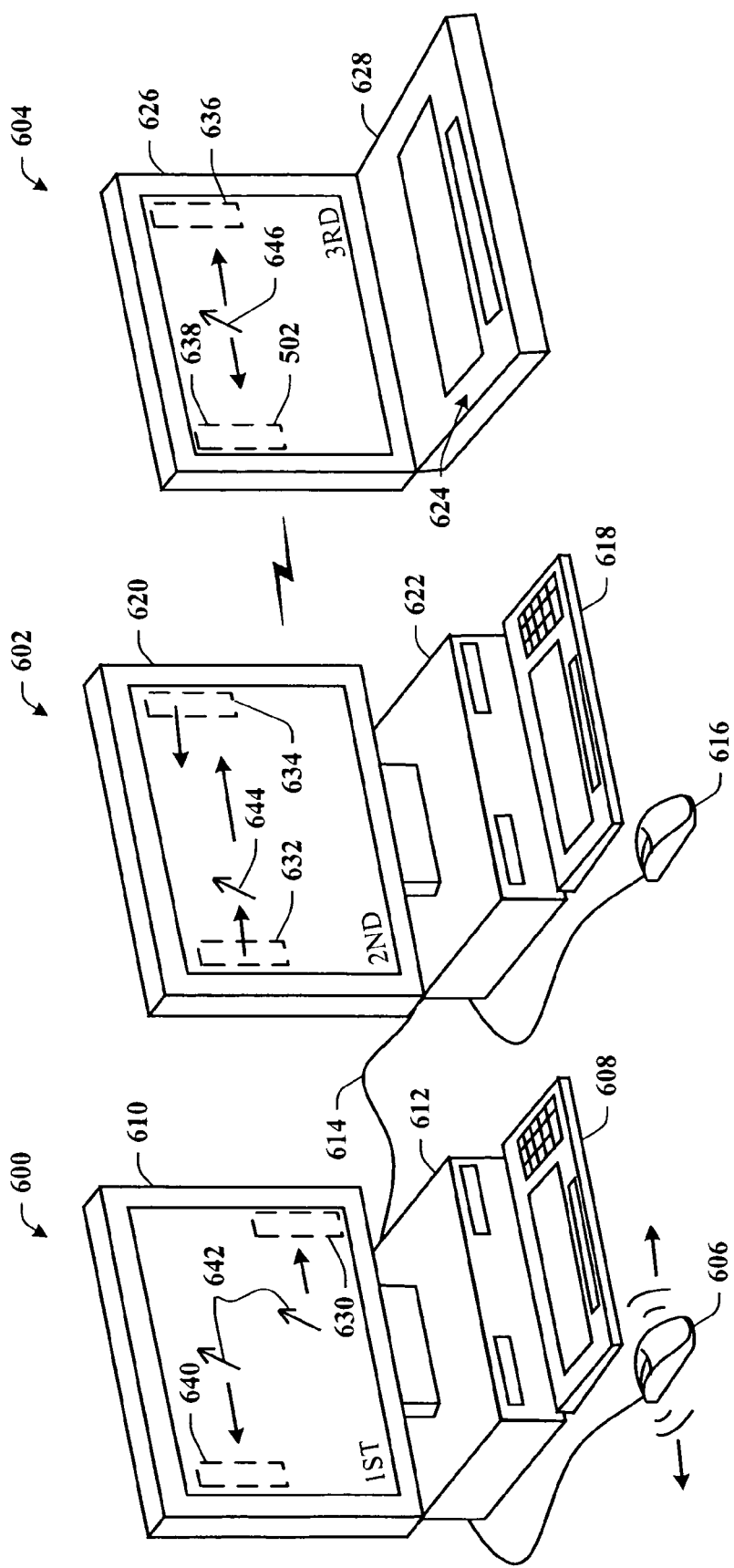
FIG. 6 illustrates a multi-computer implementation where a first computer can route input device data to a third computer through a second computer using novel aspects of the agent component of the present invention.

Referring now to FIG. 6, there is illustrated a multi-computer implementation where a first computer 600 can route input device data to a third computer 604 (e.g., a laptop or notebook) through a second computer 602 using novel aspects of the agent component of the present invention. The first computer system 600 includes a mouse input device 606, a keyboard 608, a first display 610, an agent component, and a chassis 612 that houses at least the CPU, I/O interface devices, peripheral devices, data storage, power supply, and memory. The first computer 600 is disposed in wired communication on a network 614 along with the second computer system 602, while the third computer 604 is disposed in wireless communication with the network 614. The second computer 602 includes a mouse input device 616, a keyboard 618, a second display 620, an agent component, and a chassis 622 that houses at least the CPU, I/O interface devices, peripheral devices, data storage, power supply, and memory. Similarly, the third computer system 604 includes a keyboard 624, a third display 626, an agent component, and a chassis 628 that houses at least the CPU, I/O interface devices, peripheral devices, data storage, power supply, and memory. Since the third computer 604 does not have a mouse, the input device routing capabilities of the present invention allow for the mouse 606 and keyboard 608 to be used for controlling the third computer 604, in addition to using the keyboard 624 of the third computer 604.

During or after installation, the agent of the first (or local) system 600 is configured (manually or automatically) to associate a first display area 630 with routing of local input device data generated from the mouse 606 and keyboard 608, for example, to the second computer 602. The second system 602 has a similar second display area 632 designated by the agent for signaling a desire to change routing of the local input device data back to the first computer 600. Additionally, the second computer 602 has a third display area 634 associated with routing the local input device data received from the first computer 600 to the third computer 604. The third computer 604 has a fourth display area 636 configured in accordance with its agent to trigger rerouting of the local input device data back to the second computer 602. This can occur by the agent of the third computer 604 signaling the second computer agent to switch control locally to itself. Additionally, the third computer 604 can also implement a fifth display area 638 that triggers rerouting of the local input device data back to the first computer 600 by its agent signaling the local agent of the first computer 600 to reroute input data locally. The first computer 600 also includes sixth display area 640 for routing input device data directly to the third computer 604, bypassing the second computer 602. Thus, the agents can be configured to respond in a daisy-chain fashion to allow rerouting of the local input device data through successive computers (e.g., in an ad hoc peer-to-peer topology) or to a specific computer of three or more computer systems.

The user of the first computer 600 moves a pointer 642 to the display area 630, which triggers its resident agent to route the input device data of the mouse 606 to the corresponding computer system, here the second computer system 602. On the second system 602, the pointer 642 becomes a pointer 644, which pointer 644 can be moved into the third display area 634 to further route the local input device data of the mouse 606 to the third system 604 for control thereof. The pointer 644 then becomes a pointer 646 on the third display 626. The user can then return control to the second system 602 via the mouse 606 by moving the pointer 646 back into the fourth display area 636, which pointer 646 becomes pointer 644 on the second display 620. Alternatively, the pointer 646 can be moved into the fifth display area 638 of the third display 626, which causes its agent to signal the agent of the first system 600 to reroute processing of the input device data of the mouse 606 to the first system 600. The pointer 646 then becomes the pointer 642 on the first display 610.

As indicated previously, the agent component of the present invention provides the capability to allow the user at the first computer 600 to use the first mouse 606 to control the second computer 602, while also using the keyboard 618 of the second computer 602 for its designed purposes. Similarly, when the input device control is from the first computer 600 to the third computer 604, the keyboard 608 of the first computer 600 can be used to control the third computer 604 along with the keyboard 624 of the third computer 604. Thus, the numbers of input devices that can be used in varying combinations with the disclosed agent are many.

Additionally, the number and location of display areas can be designated for use in accordance with the agent in many different ways. The display areas can be located on the top or bottom of the display or corners. The agent can be configured to route input device data to another computer based upon the combination of the mouse pointer location and a depressed key of the keyboard. Still further, a voice command can be employed along with the location of the pointer to trigger routing of the data to a different computing system. In another implementation, the user can select an icon to automatically invoke routing the input device data to another machine. Thus, many different implementations can be utilized to provide a smooth transition from one computing system to another and/or to ensure that access from one system to another is authorized, e.g., through the use of an auto-login when the data routing is invoked by the local agent to a second system.

Figure 7:
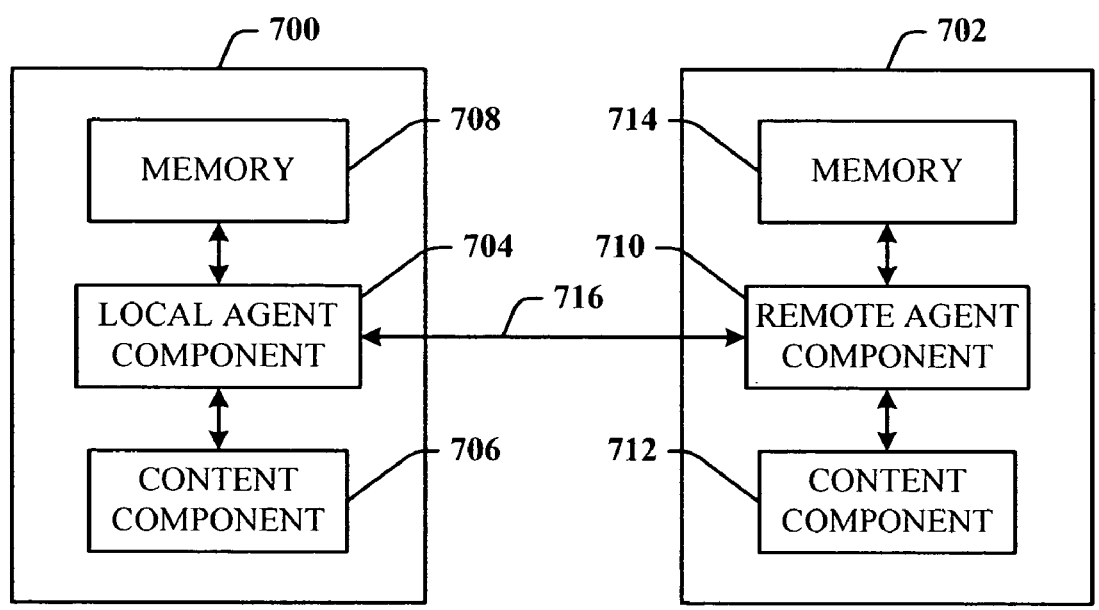
FIG. 7 illustrates a data transfer implementation that can be utilized in accordance with the present invention.

Referring now to FIG. 7, there is illustrated a data transfer implementation that can be utilized in accordance with the present invention. The disclosed invention also facilitates sharing content (e.g., text, images, and multimedia) between computing systems utilizing extended copy and paste functionality as facilitated by a chain of system clipboards. In order to illustrate such capabilities, FIG. 7 shows a head-to-head arrangement of two systems: a local computing system 700 and a remote computing system 702. The local system 700 includes a local agent component 704 (similar to agents 100, 204, and 216), a local content component 706 (e.g., a document or program) that includes content that can be copied (the content can be accessed in accordance with any manner provided to obtain text, images, video, audio, or any file content associated with programs and data of the local system 700), and a local memory 708 for storing the content captured via the local agent component 704.

The remote system 702 includes similar components, including a remote agent component 710 (similar to agents 100, 204, 216, and 704), a remote content component 712 (e.g., a document or program) that includes content that can be pasted (the content can be accessed in accordance with any manner provided to obtain text, images, video, audio, or any file content associated with programs and data of the local system 700), and a remote memory 714 for storing the content captured via the remote agent component 710. The local agent 704 and remote agent 710 communicate directly or indirectly via a connection 716 (wired or wireless). Note that the copy and paste processes do not need to be performed by the resident agent; the memory need only be accessible directly or indirectly such that the content can be handled in the desired manner to complete the desired copy or paste operation. The memories (708 and 714) can be the respective system clipboard data storage locations. Thus, the system clipboard chain can be utilized to access the clipboard data from any application.

The user selects the content of the local content component 706 to be copied, which selected content is copied to the local clipboard (facilitated by the local memory 708) on the local system 700. When the local agent 704 has transferred input device control of the associated local input device (not shown) to the remote agent 710, the user can then choose to paste the local content of the local memory 708 into a document of the remote system 702 (facilitated by the remote memory 714). To access the local content of the local memory 708 (e.g., portions thereof associated with the clipboard) from the second system 702, the local agent component 704 encapsulates the content from the local memory 708 and transmits the encapsulated content to the remote agent component 710. The remote agent 710 stores the encapsulated content in one area of the remote memory 714 for later access. As an optimization, if the content is expressible in a form that is already available from both machines, e.g., a document on a networked drive or a website, only the link (e.g., UNC (universal naming convention) path or URL uniform resource locator)) need be transmitted.

The encapsulated content can define various attributes about the content such as content types, restrictions, etc. Using these attributes, the remote agent 710 accesses and verifies whether the encapsulated content can be copied to the selected target application or program on the remote system 702. In one embodiment, the encapsulated content is transferable, in response to which the remote agent 710 places the unencapsulated content on the clipboard (an area of the remote memory 714 associated with the clipboard) of the remote system 702 for later access. Using the input device of the local system 700, the user can then select the desired program, application, or document of the remote system 702, and perform a paste function to paste the unencapsulated content of the remote memory 714 thereinto.

In another embodiment, the encapsulated content can be automatically transmitted to all networked computers associated with the user, similar to a broadcast operation. Each system clipboard of the recipient computers will then be responsible for verifying whether the encapsulated content can be copied to the selected target application or program on the remote system. Alternatively, the encapsulated contented can be transmitted to one or more networked computers that are currently being used. The computers can be associated with the user in the database or a non-user computer that offers visitor access to the user.

Figure 8:
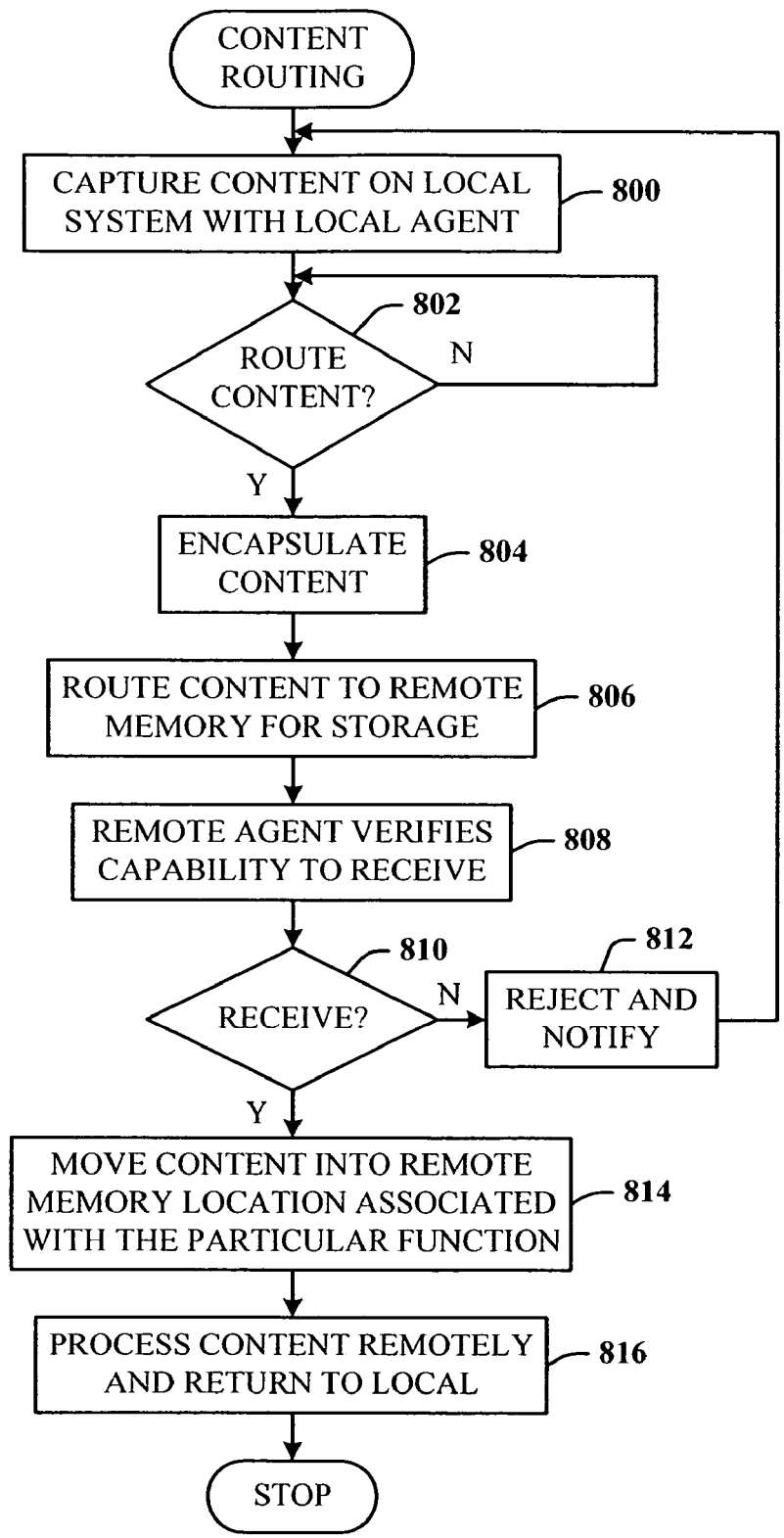
FIG. 8 illustrates a flow chart of the process for copying content from a local system to a remote system utilizing an agent of the present invention.

Referring now to FIG. 8, there is illustrated a flow chart of the process for copying content from a local system to a remote system utilizing an agent of the present invention. At 800, content is captured on the local system facilitated by the system clipboard and the local agent. At 802, a determination is made as to whether the pointer location is associated with routing the input device data to a remote system. This can be a manual operation where the user controls whether the content will be transmitted to the remote system. Alternatively, no user interaction is required, wherein the local system, via the local and remote agents, automatically facilitate transmission the clipboard content from the local clipboard to the remote clipboard. If NO, flow is back to the input of 802 to continue to monitor the pointer location. If YES, flow is to 804 to encapsulate the content. At 806, the encapsulated content is routed to the remote agent, and then to the remote memory for storage. At 808, the remote agent verifies whether the content can be processed properly for use by the remote system. At 810, if the content cannot be properly processed, flow is to 812 to reject the stored content and notify the user that the content cannot be used. Of course, the remote agent can request or facilitate the request of a resend of the content. Flow is then back to the input of 800. If the content can be processed by the remote system, flow is from 810 to 814 to remove the content from the existing memory location, unencapsulate it, and place it into a memory location associated with the particular function (e.g., the clipboard). At 816, the content is then processed by the remote system for the particular function, e.g., pasting into a document. The process then reaches a Stop block. Note that additional checks can be made to ensure that the remote system is associated with the user.

Figure 9:
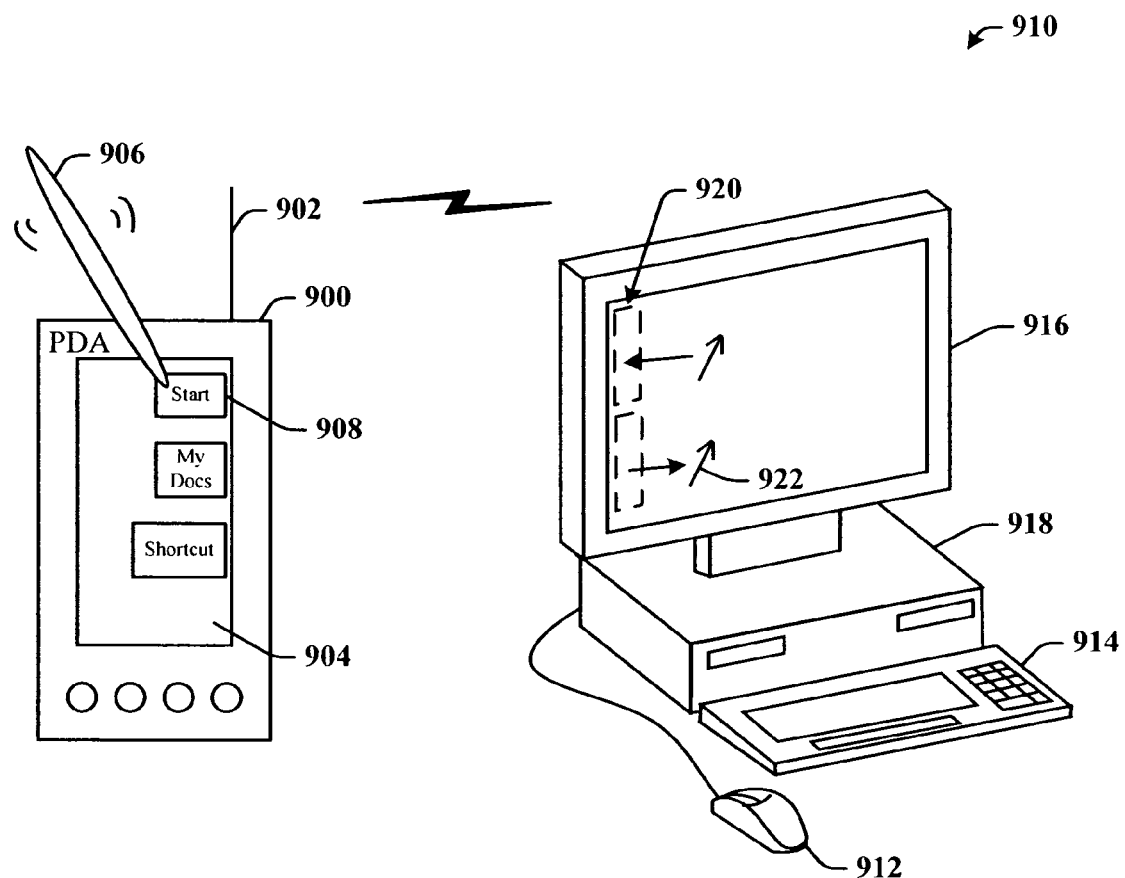
FIG. 9 illustrates implementation of a stylus-based device in accordance with aspects of the present invention.

Referring now to FIG. 9, there is illustrated implementation of a stylus-based device 900 in accordance with aspects of the present invention. The device 900 is a portable handheld unit with an antenna 902 for wireless communications. The device 900 includes a display 904 for presenting text and graphics. The display 904 also facilitates user interaction by using a stylus (or pen) 906 to control the device 900. The device also includes other controls, inputs, and/or outputs for, e.g., making adjustments, entering data, inputting voice data, outputting audio data, and making a wired connection thereto. The device 900 includes a local agent (not shown), the configuration of which designates a switching location 908 of the display 904 to trigger the routing of input device data associated with the stylus/display interface to a remote computer 910.

The remote computer 910 includes a mouse input device 912, a keyboard 914, a display 916, and a chassis 918 that houses at least the CPU, I/O interface devices, peripheral devices, data storage, power supply, and memory. The remote computer 910 also includes a remote agent that facilitates the novel aspects of the present invention. The remote agent is used to designate one or more display areas 920 for triggering routing in accordance with the present invention.

Since the size of the display 904 of the device 900 relative to the display 916 is significantly different, the present invention utilizes a modified UI for facilitating interaction between the remote computer 910 and the stylus-based input device 900 (e.g., a Personal Data Assistant). In accordance with this aspect, stylus-based computing devices require direct manipulation of display objects by touching the display screen. One solution to allow the stylus-based device 900 to control the remote computer 910 is to emulate all or a portion of the target computer control elements on the device 900. For example, graphical controls that could be replicated on the display 904 include a Start graphic, a Trash icon, My Documents icon, and a dropdown menu and the associated menu options. Accordingly, the user could directly select the emulated display objects on the emulated display 904 to facilitate control of the remote system 910.

Note that since the portable device 900 is in direct communication with the remote computer 910, network authorization is not necessarily required, as with some previously mentioned embodiments. It is to be appreciated that the local agent can include capabilities for listing or identifying devices suitable for communicating with the host system. Thus, the user of the remote system 910 can configure the internal remote agent to communicate with the device 900 any time the device 900 is within a suitable range for performing stable communications. Authorization to communicate can be as simple as transmitting a unique ID of the device 900 to the remote agent for comparison with an approved device table stored on the remote system 910. If the unique ID is listed in the table, communications therebetween can proceed. Of course, this process can be performed such that the device 900 includes an approved device table against which a unique ID of the remote system 910 is checked.

Figure 10:
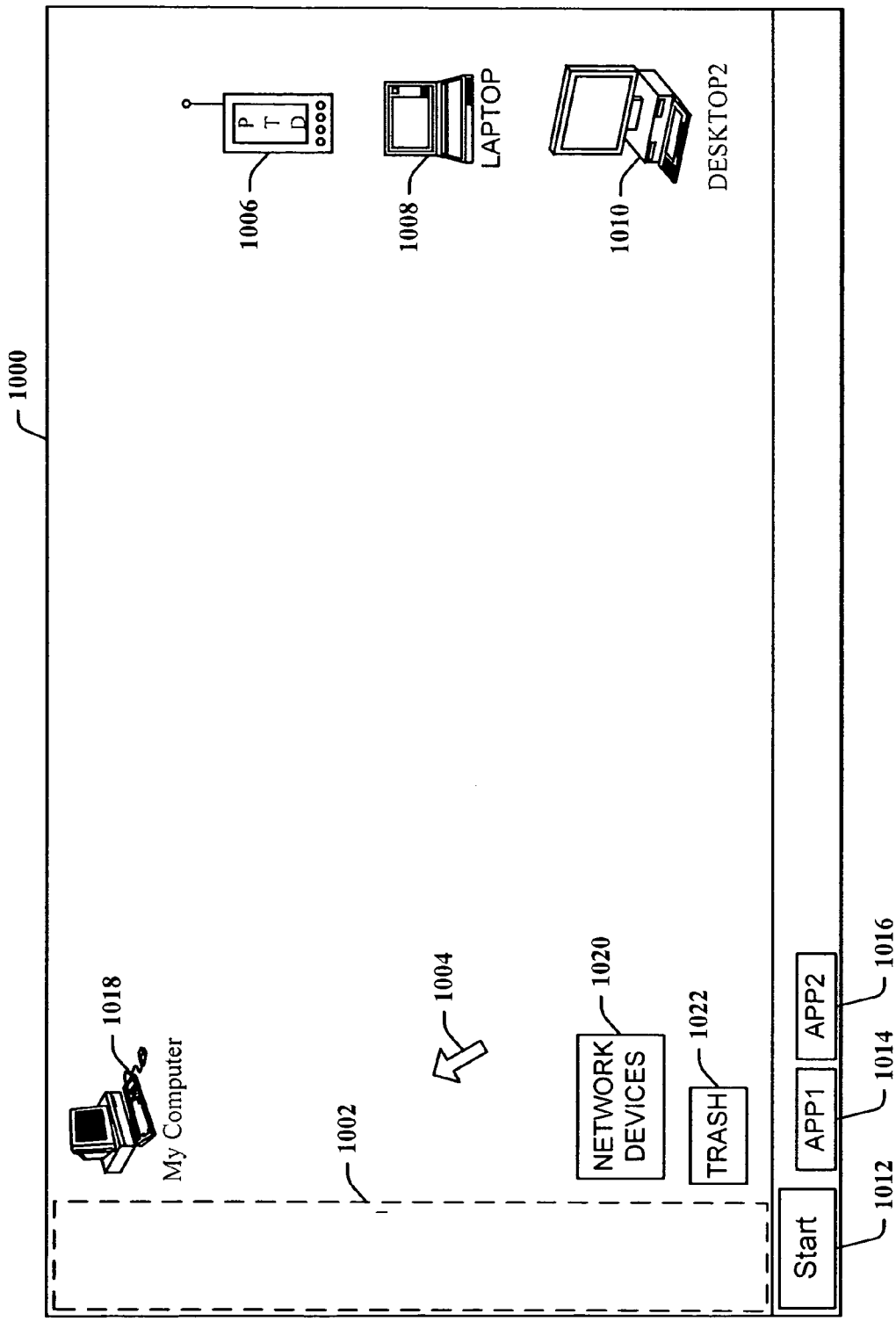
FIG. 10 illustrates a sample UI of a computer system for accommodating the novel aspects of the present invention.

Referring now to FIG. 10, there is illustrated a sample UI 1000 of a computer system for accommodating the novel aspects of the present invention. During or after installation of the agent component, one or more regions of the display can be designated for triggering routing of the input device data to a remote device. Here, a region 1002, which can be made invisible to the user, as indicated by the dashed line, is mapped to trigger routing of input device control. By moving a pointer 1004 into the region 1002, the agent component is signaled that coordinates of the pointer 1004 coincide with one or more coordinates of the region 1002. The agent then routes pointer control (as associated with one or more local input devices, e.g., a mouse and a keyboard) to a remote pointer (or program cursor) of a remote system. Of course, a number of regions can be employed in various shapes and sizes, and located in many different areas of the UI 1000 to trigger routing of input device control to other computing devices.

In an alternative implementation, the local UI 1000 includes icons that are graphical representations of devices associated with the user. Here, the user also utilizes a portable terminal device (PTD) 1006, a laptop 1008, and a second desktop machine 1010. The agent can be configured to allow the user to simply select one of the icons, e.g., the PTD 1006, such that after being selected, the agent automatically routes input device data to the PTD 1006 for control thereof. Similarly, the user can select the laptop icon 1008 to initiate input device control of the laptop. Finally, the user can select the desktop icon 1010 to initiate input device interaction therewith via the agent.

The UI 1000 also includes typical graphics and controls to allow the user to launch applications and interact with the local computing system and remote systems. For example, a Start graphic selection 1012 allows the user to select an application to launch. Two application graphics (1014 and 1016) allow quick launching of the respective applications. A My Computer icon 1018 allows the user to access files and devices of the local system.

Figure 11:
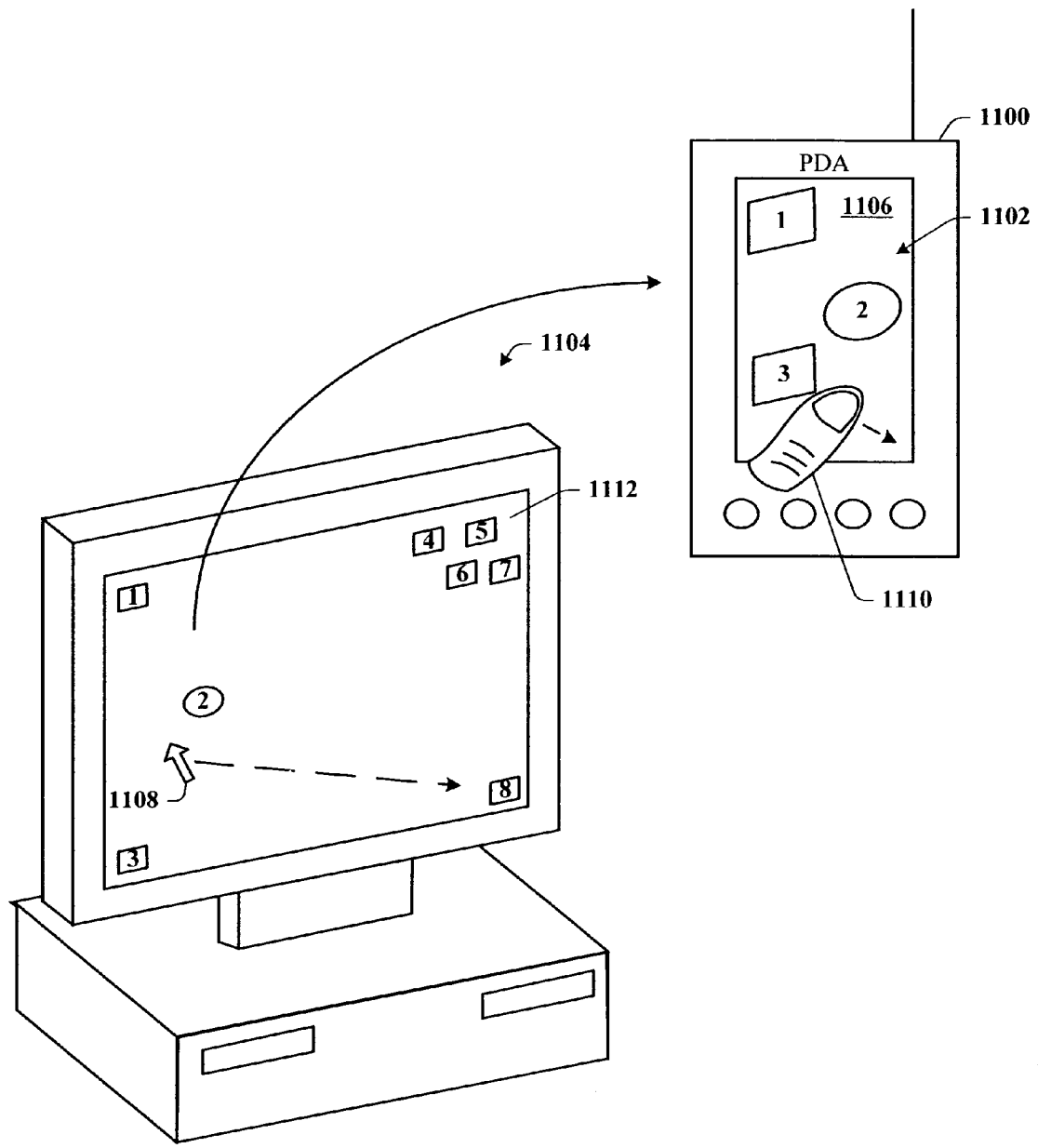
FIG. 11 illustrates a portable device that employs a user interface to emulate a touch pad for interacting with a remote computing device in accordance with capabilities of the agent component of the present invention.

Referring now to FIG. 11, there is illustrated a portable device 1100 that employs a user interface 1102 to emulate a touch pad for interacting with a remote computing device 1104 in accordance with capabilities of the agent component of the present invention. The portable device 1100 includes a display 1106 designed to accommodate touch interaction. The emulated touch pad interface 1102 provides for control of a pointer 1108 (or cursor) of the remote computing device 1104 using a PDA, for example. The emulated touch-pad interface 1102 is similar to a laptop computer touch-pad in which a movement in the form of strokes by a finger 1110, for example, along the touch-pad results in a relative movement of the pointer 1108 on a display screen 1112 of the remote computing device 1104. Further, tap movements on the touch pad interface 1102 are processed by the agent to correspond to single and double click inputs typically employed to make selections and/or launch applications. These inputs are transmitted to the remote agent of the remote system 1104, and therefrom, communicated to the operating system for application according to the current process. The emulated touch pad interface 1102 can also include emulated buttons (not shown) for registering single and double click inputs. Because the display 1106 facilitates the touch pad interface 1102, the user can focus on movement of the pointer 1108 of the remote display screen 1112 without having to repeatedly reference the portable device 1100, which provides improved usability.

In a more robust implementation, auto-scaling can be facilitated by the agent such that presentation of larger graphics of the remote system 1104 can be utilized by the device 1100. Auto-scaling can employ compression (or elimination) of space (e.g., blank space) that does not provide any meaningful function or purpose related to interacting with the portable device 1100. Thus, only control objects of the remote system 1104 will be displayed on the device 1100. Auto-scaling can also include segmenting the remote display 1112 into smaller sections each of which can be presented on the portable device 1100. The agent can also be employed to anticipate next screen on the device 1100 based on the direction of movement of the finger on the touch pad.

Figure 12:
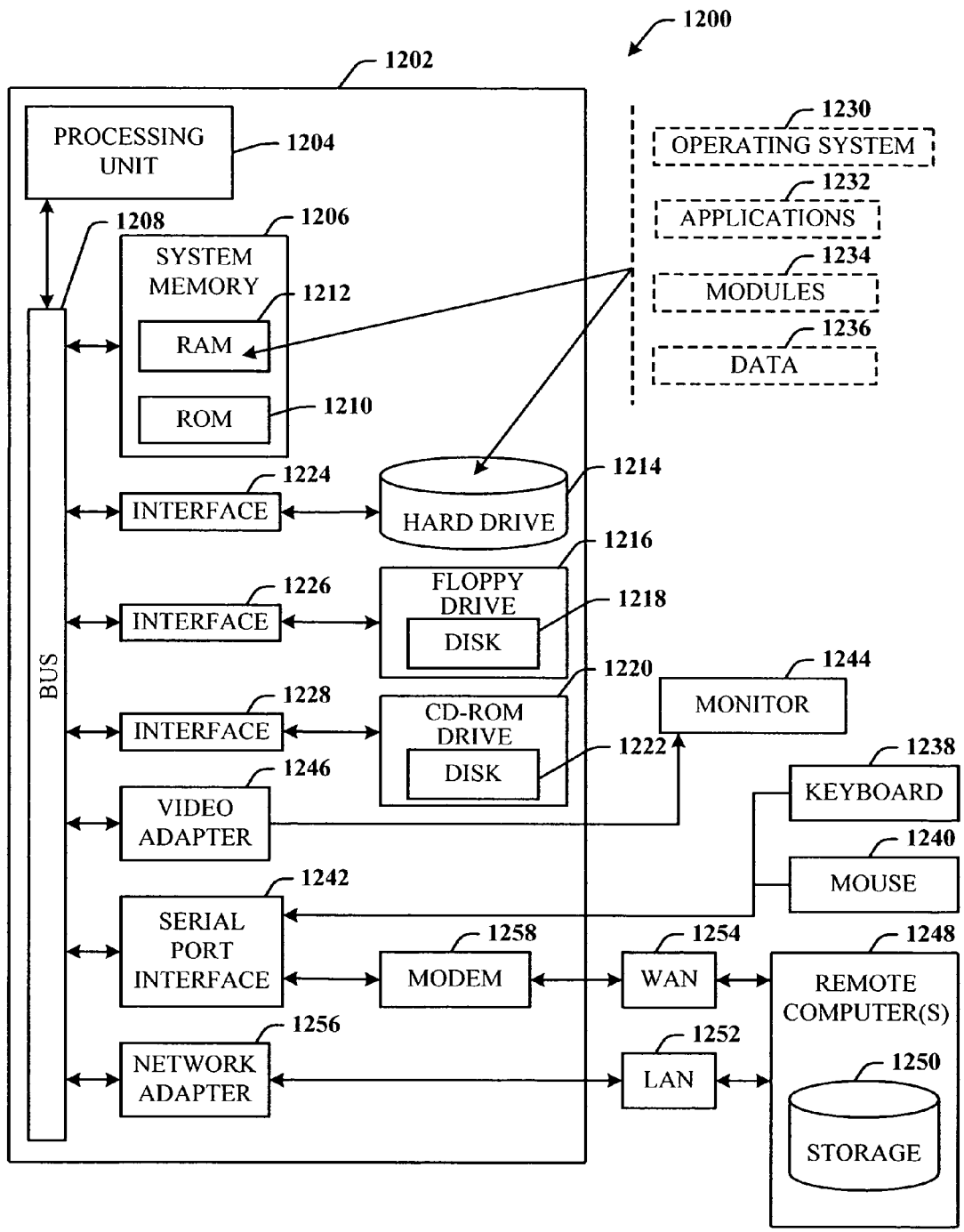
FIG. 12 illustrates a block diagram of a computer operable to execute the disclosed architecture.

Referring now to FIG. 12, there is illustrated a block diagram of a computer operable to execute the disclosed architecture. In order to provide additional context for various aspects of the present invention, FIG. 12 and the following discussion are intended to provide a brief, general description of a suitable computing environment 1200 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc., that perform particular tasks or implement particular abstract data types. Moreover, those skilled in the art will appreciate that the inventive methods may be practiced with other computer system configurations, including single-processor or multi-processor computer systems, minicomputers, mainframe computers, as well as personal computers, band-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference again to FIG. 12, there is illustrated an exemplary environment 1200 for implementing various aspects of the invention includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 may be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up.

The computer 1202 further includes a hard disk drive 1214, a magnetic disk drive 1216, (e.g., to read from or write to a removable disk 1218) and an optical disk drive 1220, (e.g., reading a CD-ROM disk 1222 or to read from or write to other high capacity optical media such as Digital Video Disk (DVD)). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The drives and their associated computer-readable media provide nonvolatile storage of data, data structures, computer-executable instructions, and so forth. For the computer 1202, the drives and media accommodate the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 1212, including an operating system 1230, one or more application programs 1232, other program modules 1234 and program data 1236. It is appreciated that the present invention can be implemented with various commercially available operating systems or combinations of operating systems.

A user can enter commands and information into the computer 1202 through a keyboard 1238 and a pointing device, such as a mouse 1240. Other input devices (not shown) may include a microphone, an IR remote control, a joystick, a game pad, a satellite dish, a scanner, or the like. These and other input devices are often connected to the processing unit 1204 through a serial port interface 1242 that is coupled to the system bus 1208, but may be connected by other interfaces, such as a parallel port, a game port, a universal serial bus ("USB"), an IR interface, etc. A monitor 1244 or other type of display device is also connected to the system bus 1208 via an interface, such as a video adapter 1246. In addition to the monitor 1244, a computer typically includes other peripheral output devices (not shown), such as speakers, printers etc.

The computer 1202 may operate in a networked environment using logical connections via wired and/or wireless communications to one or more remote computers, such as a remote computer(s) 1248. The remote computer(s) 1248 may be a workstation, a server computer, a router, a personal computer, portable computer, microprocessor-based entertainment appliance, a peer device or other common network node, and typically includes many or all of the elements described relative to the computer 1202, although, for purposes of brevity, only a memory storage device 1250 is illustrated. The logical connections depicted include a local area network (LAN) 1252 and a wide area network (WAN) 1254. Such networking environments are commonplace in offices, enterprise-wide computer networks, intranets and the Internet.

When used in a LAN networking environment, the computer 1202 is connected to the local network 1252 through a wired or wireless communication network interface or adapter 1256. The adaptor 1256 may facilitate wired or wireless communication to the LAN 1252, which may also include a wireless access point disposed thereon for communicating with the wireless adaptor 1256. When used in a WAN networking environment, the computer 1202 typically includes a modem 1258, or is connected to a communications server on the LAN, or has other means for establishing communications over the WAN 1254, such as the Internet. The modem 1258, which may be internal or external and a wired or wireless device, is connected to the system bus 1208 via the serial port interface 1242. In a networked environment, program modules depicted relative to the computer 1202, or portions thereof, may be stored in the remote memory storage device 1250. It will be appreciated that the network connections shown are exemplary and other means of establishing a communications link between the computers may be used.

The computer 1202 is operable to communicate with any wireless devices or entities operably disposed in wireless communication, e.g., a printer, scanner, desktop and/or portable computer, portable data assistant, any piece of equipment or location associated with a wirelessly detectable tag (e.g., a kiosk, news stand, restroom), and telephone. This includes at least Wi-Fi and Bluetooth™ wireless technologies. Thus, the communication may be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 11 Mbps (802.11b) or 54 Mbps (802.11a) data rate or with products that contain both bands (dual band), so the networks can provide real-world performance similar to the basic 10BaseT wired Ethernet networks used in many offices.

Figure 13:
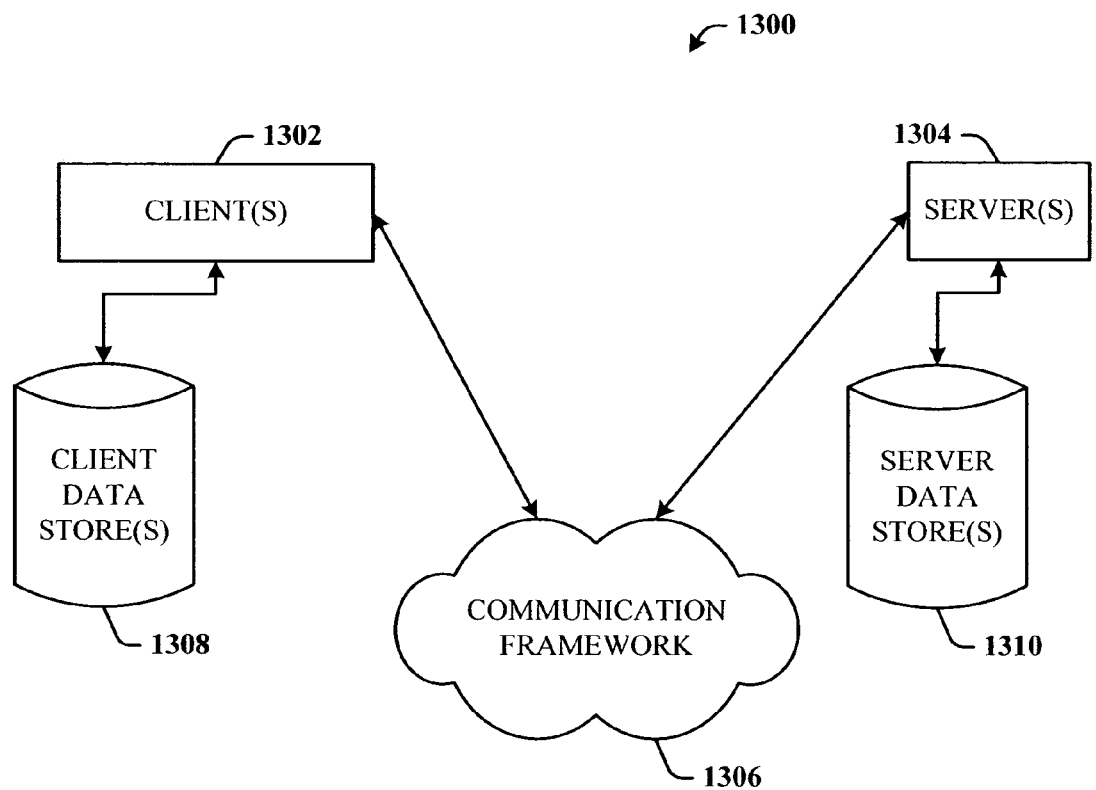
FIG. 13 illustrates a schematic block diagram of an exemplary computing environment in accordance with the present invention.

Referring now to FIG. 13, there is illustrated a schematic block diagram of an exemplary computing environment 1300 in accordance with the present invention. The system 1300 includes one or more client(s) 1302. The client(s) 1302 can be hardware and/or software (e.g., threads, processes, computing devices). The client(s) 1302 can house cookie(s) and/or associated contextual information by employing the present invention, for example. The system 1300 also includes one or more server(s) 1304. The server(s) 1304 can also be hardware and/or software (e.g., threads, processes, computing devices). The servers 1304 can house threads to perform transformations by employing the present invention, for example. One possible communication between a client 1302 and a server 1304 may be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications may be facilitated via a wired (including optical fiber) and/or wireless technology. The client(s) 1302 are operably connected to one or more client data store(s) 1308 that can be employed to store information local to the client(s) 1302 (e.g., cookie(s) and/or associated contextual information). Similarly, the server(s) 1304 are operably connected to one or more server data store(s) 1310 that can be employed to store information local to the servers 1304.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system embodied on a computer-readable storage medium that facilitates controlling a computing device, the system comprising:
 a local agent component configured to:
  receive local input device data from one or more local input devices of a local system;
  route the local input device data to a remote system for the control thereof with the one or more local input devices,
  switch the local input device data to the remote system upon detecting a motion of a user interface pointer associated with a switching area on a user interface of the local system; and
  transmit content from a local clipboard at the local system to a remote clipboard at the remote system upon detecting that the content has been copied to the local clipboard, wherein:
   a location of the switching area on the user interface of the local system is determined based on a physical location of the remote system relative to a physical location of the local system; and
   the motion of the user interface pointer associated with the switching area is selected from the group consisting of: placing the user interface pointer within the switching area, moving the user interface pointer in a particular direction within the switching area, moving the user interface pointer within a particular speed range within the switching area, and combinations thereof.

2. The system of claim 1, wherein the local agent component is further configured to receive a signal from the remote system to cease routing the local input device data to the remote system, the signal being triggered by placing a second user interface pointer at the remote system within a second switching area on a user interface of the remote system.

3. The system of claim 1, wherein the local input device data is used by the remote system along with remote input device data from one or more remote input devices to facilitate control of the remote system using at least one of the one or more local input devices, the one or more remote input devices, a combination of one or more of the local and remote input devices.

4. The system of claim 1, further comprising a remote agent component of the remote system in communication with the local agent component to facilitate control of the remote system through the remote agent component, the remote agent component signaling the local agent component to disengage control of the remote system via the one or more local input devices by routing the local input device data for processing only by the local system.

5. The system of claim 1, wherein the local agent component is further configured to emulate, on the local system, a touch pad interface derived from a user interface of the remote system to control the remote system, and wherein the touch and interface displays control objects of the remote system, and space in the user interface of the remote system that provides no meaningful function or purpose related to interacting with the local system is eliminated.

6. A system embodied on a computer-readable storage medium that facilitates control of a second computing system with a first computing system, comprising:
 a first agent programmed on the first computing system that receives local input device data from a local input device; and
 a second agent of the second computing system that communicates with the first agent to facilitate control of the second computing system, the local input device triggers routing of the local input device data by the first agent to the second agent based on a motion of a pointer associated with a switching area on a user interface of the first computing system, wherein:
  a location of the switching area on the user interface of the local system is determined based on a physical location of the remote system relative to a physical location of the local system;
 the motion of the pointer associated with the switching area is selected from the group consisting of: placing the pointer within the switching area, moving the pointer in a particular direction within the switching area, moving the pointer within a particular speed range within the switching area, and combinations thereof; and
  the first agent transmits clipboard information copied from the first computing system to the second agent to facilitate sharing of clipboard data between the first and second computing systems.

7. The system of claim 6, wherein the location of the switching area is determined manually by a user who configures a physical orientation of the second computing system with respect to the first computing system, in response to which a first switching area location is determined on the user interface of the first computing system and a second switching area location is determined on a user interface of the second computing system.

8. The system of claim 6, wherein the location of the switching area is determined automatically by automatically determining a physical orientation of the second computing system with respect to the first computing system, in response to which the first agent determines placement of the switching area on the user interface of the first computing system based on the determined physical orientation.

9. The system of claim 6, wherein the first agent facilitates copying of the clipboard data from the first computing system to the second computing system by encapsulating the clipboard data and transmitting the encapsulated clipboard data to the second agent, and wherein the second agent verifies whether the encapsulated clipboard data is allowed to be copied to the second computing system.

10. The system of claim 6, wherein the first agent of the first computing system is coupled to a database of associations between a user, the first computing system, and the second computing system such that deployment of the second computing system within a working area of the first computing system automatically facilitates control of the second computing system by the user via the first computing system.

11. A method for controlling a computer, the method comprising:
employing a processor executing computer-executable instructions stored on a computer-readable storage medium to implement acts comprising:
receiving input device data associated with a local input device of a first computing system
designating at least one switching location within a user interface of the first computing system, wherein the at least one switching location is determined based on a physical location of a second computing system relative to the first computing system such that the at least one switching location is created near or in a direction of the physical location of the second computing system;
determining whether a location of a user interface pointer coincides with the at least one switching location;
routing the input device data to the second computing system upon determining that the location of the user interface pointer coincides with the at least one switching location;
determining that content at the first computing system has been copied to a local clipboard; and
transmitting the content from the local clipboard to a remote clipboard of the second computing system upon detecting that the content has been copied to the local clipboard.

12. The method of claim 11, further comprising emulating a touch pad on a display of the first computing system to facilitate control of the second computing system.

13. The method of claim 11, further comprising tracking a physical location of the second computing system such that placement of the second computing system within a working area of the first computing system causes the first agent to automatically designate the at least one switching location within the user interface of the first computing system for control of the second computing system.

14. The method of claim 11, wherein the at least one switching location comprises at least one of a display element or an icon, and wherein placement of the user interface pointer associated with the first computing device within the at least one switching location instructs the first agent to route the input device data to the second computing system.

15. The method of claim 11, wherein transmitting the content comprises encapsulating the content and transmitting the encapsulated content to the remote clipboard of the second computing system.

16. The method of claim 11, further comprising authenticating the second computing system before transmitting the content thereto, wherein authenticating and transmitting are performed one of automatically or manually.

17. One or more computer-readable media having computer-executable instructions encoded thereon, the computer-executable instructions upon execution by one or more processors configure a computer to perform acts comprising:
receiving local input device data from one or more local input devices of a local system;
routing the local input device data to a remote system upon detecting a motion of a first user interface pointer associated with a first switching area on a user interface of the local system;
transmitting content from a local clipboard at the local system to a remote clipboard at the remote system upon detecting that the content has been copied to the local clipboard; and
routing the local input device data to the local system only upon receiving a signal from the remote system to cease routing the local input device data to the remote system, wherein:
a location of the first switching area on the user interface of the local system is determined based on a physical location of the remote system relative to a physical location of the local system such that the location of the first switching area is created near or in a direction of the physical location of the remote system;
the motion of the first user interface pointer associated with the first switching area is selected from the group consisting of: placing the first user interface pointer within the first switching area, moving the first user interface pointer in a particular direction within the first switching area, moving the first user interface pointer within a particular speed range within the first switching area, and combinations thereof; and
the signal is triggered by a motion of a second user interface pointer associated with a second switching area on a user interface of the remote system.

18. The one or more computer-readable media of claim 17, wherein the acts further comprise emulating, on the local system, a touch pad interface derived from the user interface of the remote system to control the remote system, and wherein the touch pad interface displays only control objects of the remote system, and space in the user interface of the remote system that provides no meaningful function or purpose related to interacting with the local system is eliminated.

19. The one or more computer-readable media of claim 17, wherein the acts further comprise tracking the physical location of the remote system such that placement of the remote system within a working area of the local system automatically creates the first switching area on the user interface of the local system and the second switching area on the user interface of the remote system.

20. The one or more computer-readable media of claim 17, wherein transmitting the content further comprises encapsulating the content and transmitting the encapsulated content to the remote clipboard at the remote system.

21. The one or more computer-readable media of claim 17, wherein the acts further comprise authenticating the remote system before transmitting the content thereto, wherein authenticating and transmitting are performed one of automatically or manually.

* * * * *